United States Patent
Chen (10) Patent No.: US 10,121,236 B2
(45) Date of Patent: Nov. 6, 2018

(54) AUTOMATIC ALIGNMENT APPARATUS AND ASSOCIATED METHOD

(71) Applicant: HIMAX TECHNOLOGIES LIMITED, Tainan (TW)

(72) Inventor: Kuan-Ming Chen, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 261 days.

(21) Appl. No.: 15/334,304

(22) Filed: Oct. 26, 2016

(65) Prior Publication Data
US 2018/0114311 A1    Apr. 26, 2018

(51) Int. Cl.

| | |
|---|---|
| G06T 7/00 | (2017.01) |
| G02B 27/10 | (2006.01) |
| G02B 27/62 | (2006.01) |
| H04N 5/247 | (2006.01) |
| H04N 5/33 | (2006.01) |
| H04N 9/12 | (2006.01) |
| G02B 7/00 | (2006.01) |

(52) U.S. Cl.
CPC ........... *G06T 7/0006* (2013.01); *G02B 7/003* (2013.01); *G02B 27/108* (2013.01); *G02B 27/62* (2013.01); *H04N 5/247* (2013.01); *H04N 5/33* (2013.01); *H04N 9/12* (2013.01)

(58) Field of Classification Search
CPC ........ H04N 9/3105; H04N 5/247; H04N 5/33; H04N 9/12; G06T 7/0006; G02B 7/003; G02B 27/62
See application file for complete search history.

(56) References Cited

U.S. PATENT DOCUMENTS

| | | | |
|---|---|---|---|
| 6,807,022 B1 | 10/2004 | Yanowitz | |
| 2004/0263807 A1* | 12/2004 | Kitabayashi | G03B 21/14 353/122 |
| 2007/0159548 A1* | 7/2007 | Rouh | G03B 13/10 348/333.03 |

(Continued)

FOREIGN PATENT DOCUMENTS

| | | |
|---|---|---|
| CN | 101144910 A | 3/2008 |
| TW | 528913 | 4/2003 |

(Continued)

*Primary Examiner* — Joseph Suh
(74) *Attorney, Agent, or Firm* — Winston Hsu (57) ABSTRACT

An automatic alignment apparatus applicable to assembly of an optical output module and associated methods are provided. The automatic alignment apparatus includes: an alignment tool, a beam splitter, cameras, and a processing circuit. The alignment tool is arranged to hold parts of the optical output module, and align the parts to each other according to at least one movement control signal, where the parts include a radiation source module and an optical component module. The cameras capture images to generate image signals carrying the images, and the beam splitter splits the optical path into associated sub-paths. The processing circuit generates at least one movement control signal according to at least one image signal within the image signals to perform movement control of at least one part of the parts. The alignment tool automatically aligns the parts to each other according to the at least one movement control signal.

20 Claims, 4 Drawing Sheets

(56) References Cited

U.S. PATENT DOCUMENTS

| | | | | |
|---|---|---|---|---|
| 2007/0285663 A1* | 12/2007 | Hewitt | ................. | H04N 13/398 |
| | | | | 356/399 |
| 2007/0291277 A1* | 12/2007 | Everett | ................. | A61B 3/102 |
| | | | | 356/497 |
| 2012/0113223 A1* | 5/2012 | Hilliges | .................... | G06F 3/00 |
| | | | | 348/46 |
| 2014/0016106 A1* | 1/2014 | Lin | ........................ | F21V 14/02 |
| | | | | 353/87 |
| 2016/0189387 A1* | 6/2016 | Kannan | .............. | G01B 11/2545 |
| | | | | 382/106 |
| 2017/0090142 A1* | 3/2017 | Freedman | .............. | G02B 7/003 |
| 2018/0024341 A1* | 1/2018 | Romanowski | ..... | G02B 21/0012 |
| | | | | 359/385 |
| 2018/0067331 A1* | 3/2018 | Kosakura | ............. | G02B 27/425 |
| 2018/0067567 A1* | 3/2018 | Njolstad | ................. | G06F 3/041 |

FOREIGN PATENT DOCUMENTS

| | | |
|---|---|---|
| TW | M258294 | 3/2005 |
| TW | 201419078 A | 5/2014 |

\* cited by examiner

AUTOMATIC ALIGNMENT APPARATUS AND ASSOCIATED METHOD

BACKGROUND OF THE INVENTION

1. Field of the Invention

The present invention relates to manufacturing key components of certain electronic products, and more particularly, to an automatic alignment apparatus and an associated method that are applicable to assembly of an optical output module such as an infrared (IR) optical output module.

2. Description of the Prior Art

According to the related art, a laser pointer may be implemented with a laser diode and a single lens, together with a simple circuit comprising a battery, a resistor, etc., so as to generate a thin laser beam that may cause a laser light spot having the size of a few millimeters on an object when the laser pointer is pointed toward it. With regard to manufacturing an optical output module of a certain electronic product, for example, a product related to statistics according to IR images, etc., the expected optical output is quite different, which means a single lens such as that mentioned above typically does not work in this case. As the optical design of the optical output module is much more complicated than that of the laser pointer, proper alignment during assembly of the optical output module may take a lot of time, causing associated costs to be increased. Thus, a novel architecture and associated method are required for dealing with this issue.

SUMMARY OF THE INVENTION

It is an objective of the claimed invention to provide an automatic alignment apparatus and an associated method, in order to solve the above-mentioned problems.

It is another objective of the claimed invention to provide an automatic alignment apparatus applicable to assembly of an optical output module, and to provide an associated method, in order to guarantee the overall performance of an electronic product in which the optical output module should be installed.

According to a first aspect of the present invention, an automatic alignment apparatus applicable to assembly of an optical output module is provided. For example, the automatic alignment apparatus may comprise: an alignment tool, a beam splitter, a first camera, a plurality of second cameras, and a processing circuit. The alignment tool may be arranged to hold different parts of the optical output module, wherein the parts comprise a radiation source module and an optical component module. The beam splitter may be positioned on an optical path that starts from the radiation source module, and may be arranged to split the optical path into a first sub-path allowing first image contents being projected on a screen by the optical output module and a second sub-path allowing second image contents being projected toward a direction different from that of the screen by the optical output module. In addition, the first camera may be arranged to capture at least one first image to generate a first image signal carrying the first image, wherein the first image corresponds to the first image contents projected on the screen by the optical output module. The plurality of second cameras may be arranged to capture a plurality of second images to generate second image signals carrying the second images, respectively, wherein the second images correspond to the second image contents projected by the optical output module, respectively. Additionally, the processing circuit may be arranged to generate at least one movement control signal according to at least one image signal within the first and the second image signals to perform movement control of at least one part of the parts. Further, the alignment tool may be further arranged to automatically align the parts to each other according to the at least one movement control signal.

According to a second aspect of the present invention, a method for performing automatic alignment is provided, where the method is applicable to assembly of an optical output module. For example, the method may comprise: holding different parts of the optical output module, wherein the parts comprise a radiation source module and an optical component module; utilizing a beam splitter, positioned on an optical path that starts from the radiation source module, to split the optical path into a first sub-path allowing first image contents being projected on a screen by the optical output module and a second sub-path allowing second image contents being projected toward a direction different from that of the screen by the optical output module; capturing at least one first image to generate a first image signal carrying the first image, wherein the first image corresponds to the first image contents projected on the screen by the optical output module; capturing a plurality of second images to generate second image signals carrying the second images, respectively, wherein the second images correspond to the second image contents projected by the optical output module, respectively; generating at least one movement control signal according to at least one image signal within the first and the second image signals to perform movement control of at least one part of the parts; and automatically aligning the parts to each other according to the at least one movement control signal.

It is an advantage of the present invention that the automatic alignment apparatus and the associated method can guarantee the overall performance of an electronic product in which the optical output module should be installed. In addition, the automatic alignment apparatus and the associated method can increase the speed of assembly of the optical output module. As a result, related art problems may be prevented.

These and other objectives of the present invention will no doubt become obvious to those of ordinary skill in the art after reading the following detailed description of the preferred embodiment that is illustrated in the various figures and drawings.

DETAILED DESCRIPTION

According to embodiments of the present invention, an automatic alignment apparatus and a method for performing automatic alignment are provided, where the automatic alignment apparatus and the method are applicable to assembly of an optical output module. The optical output module may be utilized as a key component of a certain electronic product, for example, a product related to statistics according to infrared (IR) images, etc. For example, the radiation source module may comprise an IR laser diode, and the optical component module may comprise multiple optical components corresponding to a complicated optical design model. The automatic alignment apparatus and the method can correctly align different parts of the optical output module to each other with aid of multiple sets of detection operations respectively corresponding to different sub-paths split from an optical path that starts from the IR laser diode, and therefore can guarantee the overall performance of an electronic product in which the optical output module should be installed. In addition, the automatic alignment apparatus and the method can automatically align the parts of the optical output module to each other, and therefore can increase the speed of assembly of the optical output module. As a result, related art problems may be prevented.

Figure 1:
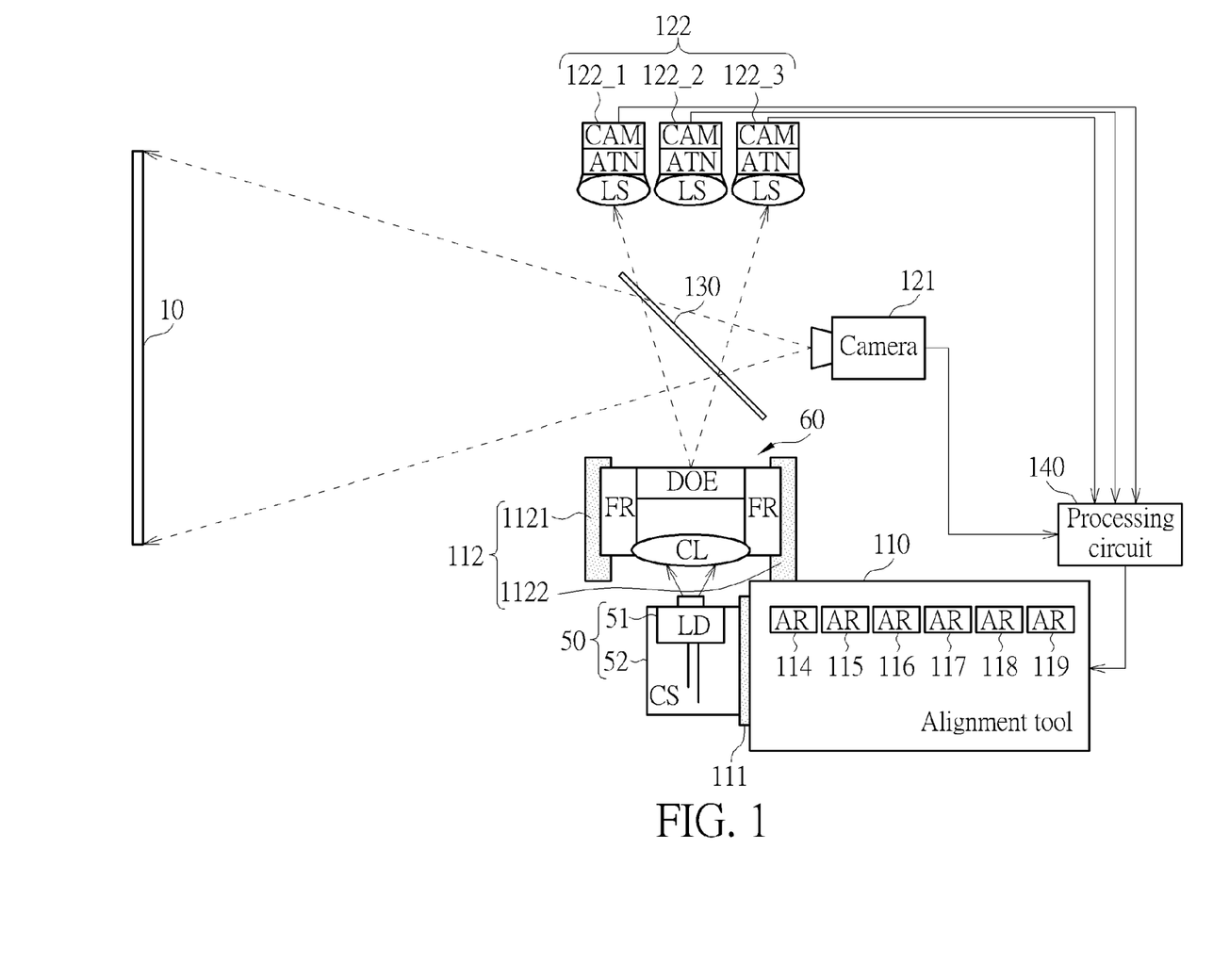
FIG. 1 is a diagram of an automatic alignment apparatus according to an embodiment of the present invention.

FIG. 1 is a diagram of an automatic alignment apparatus according to an embodiment of the present invention, where the automatic alignment apparatus shown in FIG. 1 can be taken as an example of the automatic alignment apparatus mentioned above. For example, the parts of the automatic alignment apparatus may comprise a radiation source module 50 and an optical component module 60. In this embodiment, radiation source module 50 may comprise a radiation source 51 and a casing (CS) 52. For better comprehension, the radiation source 51 of this embodiment may be labeled "LD" to indicate that a laser diode (LD) such as the IR laser diode can be taken as an example of the radiation source 51. In addition, the optical component module 60 may comprise some optical components such as the collimation lens (CL) and the diffractive optical element (DOE), and may further comprise a frame (FR) for fixing the relative locations of the optical components according to the designed optical model thereof. For better comprehension, the optical component module 60 may be illustrated with a cross section view to clearly indicate the optical components therein.

As shown in FIG. 1, the automatic alignment apparatus may comprise an alignment tool 110, a first camera 121, a plurality of second cameras 122, a beam splitter 130, and a processing circuit 140. The alignment tool 110 may comprise a plurality of holders and a plurality of actuators. For example the plurality of holders may comprise two holders 111 and 112, and the plurality of actuators may comprise six actuators 114, 115, 116, 117, 118, and 119. For simplicity, the holders 111 and 112 are merely illustrated with some partial structures thereof (e.g. a partial structure of the holder 111, and the partial structures 1121 and 1122 of the holder 112). In addition, the first camera 121 may be equipped with a lens module for capturing images on the screen 10. For simplicity, the first camera 121 is illustrated to be positioned at a specific location at an intersection of two dashed lines. Based on different designs of the lens module, the location of the first camera 121 may vary. For example, the first camera 121 may be positioned somewhere along the axis of the screen 10, with the beam splitter 130 positioned between the first camera 121 and the screen 10, and the optical axis of the lens module may be aligned to the axis of the screen 10. Additionally, the plurality of second cameras 122 may comprise N second cameras 122_1-122_N, where the notation "N" may represent a positive integer that is greater than one. For example, N=3, and the N second cameras may comprise the second cameras 122_1, 122_2, and 122_3 (respectively labeled "CAM" in FIG. 1, for brevity). In this embodiment, each second camera within the plurality of second cameras 122 may be equipped with an attenuator (ATN) and a lens set (LS) to receive some image contents that are directly projected toward the second camera. The attenuator may be utilized for attenuating strong illumination from the radiation source 51, and the lens set may be utilized for imaging the image contents onto the image sensor of the second camera. As shown in FIG. 1, the beam splitter 130 may be positioned between the holder 112 (which may hold the optical component module 60) and the plurality of second cameras 122, and may be positioned between the screen 10 and the first camera 121. For example, the beam splitter 130 may be a plate-type beam splitter, which may be referred to as the plate beam splitter. For another example, the beam splitter 130 may be a cube-type beam splitter, which may be referred to as the cube beam splitter. Further, the processing circuit 140 may control operations of the automatic alignment apparatus according to the method. For example, the processing circuit 140 may comprise at least one processor, and one or more program modules for performing an automatic alignment algorithm corresponding to the method may run on the processor. For another example, the processing circuit 140 may be implemented with a customized circuit such as an application-specific integrated circuit (ASIC), and one or more sub-circuits thereof may perform operations according to the automatic alignment algorithm.

According to this embodiment, the alignment tool 110 may be arranged to hold different parts of the optical output module, where the parts comprise the radiation source module 50 and the optical component module 60. The beam splitter 130 may be positioned on an optical path that starts from the radiation source module 50, and may be arranged to split the optical path into a first sub-path (e.g. a leftward sub-path starting from the beam splitter 130 in this embodiment) allowing first image contents being projected on the screen 10 by the optical output module and a second sub-path (e.g. an upward sub-path starting from the beam splitter 130 in this embodiment) allowing second image contents being projected toward a direction different from that of the screen 10 by the optical output module. For example, the two arrows illustrated with dashed lines around the left half of FIG. 1 may indicate the boundaries of the leftward sub-path, and the two arrows illustrated with dashed lines around the upper half of FIG. 1 may indicate the boundaries of the upward sub-path. As a result of the arrangement shown in FIG. 1, the whole set of image contents projected through the second sub-path is equivalent to the whole set of image contents projected through the first sub-path, regardless of the optical power difference between the first and the second sub-paths. As the whole set of image contents projected through the first sub-path is the whole of the first image contents, and as the whole set of image contents projected through the second sub-path comprises the second image contents, the second image contents may be regarded as local image contents with respect to the first image contents. Please note that the reflection ratio of the beam splitter 130 is not equivalent to the transmission ratio of the beam splitter 130 (e.g. the reflection ratio is higher than the transmission ratio in this embodiment), and optical power on the first sub-path is higher than that on the second sub-path. In addition, the first camera 121 may be arranged to capture at least one first image to generate a first image signal carrying the first image, where the first image corresponds to the first image contents projected on the screen by the optical output module. The plurality of second cameras 122 may be arranged to capture a plurality of second images to generate second image signals carrying the second images, respectively, where the second images correspond to the second image contents projected by the optical output module, respectively. Additionally, the processing circuit 140 may be arranged to generate at least one movement control signal (e.g. a plurality of movement control signals for controlling the actuators 114-119 in this embodiment) according to at least one image signal within the first and the second image signals (e.g. the image signals from the cameras 121 and 122) to perform movement control of at least one part of the parts. Further, the alignment tool 110 may be further arranged to automatically align the parts to each other according to the movement control signal(s).

In this embodiment, the holders 111 and 112 may respectively hold the radiation source module 50 and the optical component module 60 during multiple phases for assembly of the optical output module, and the actuators 114-119 may receive the plurality of movement control signals, and control movement of a specific module within the radiation source module 50 and the optical component module 60 with respect to another module within the radiation source module 50 and the optical component module 60 according to the plurality of movement control signals in an alignment phase, where the phases for assembly of the optical output module may comprise the alignment phase. For example, at least one first actuator within the actuators 114-119 (e.g. three shift actuators corresponding to three axes such as X-axis, Y-axis, and Z-axis) may be arranged to shift the specific module according to at least one first movement control signal (e.g. three associated shift control signals) within the plurality of movement control signals, and at least one second actuator within the actuators 114-119 (e.g. three rotation actuators corresponding to the three axes) may be arranged to rotate the specific module according to at least one second movement control signal (e.g. three associated rotation control signals) within the plurality of movement control signals. For example, the specific module and the other module may represent the optical component module 60 and the radiation source module 50, respectively, and the holder 111 may be kept static so the radiation source module 50 does not move, and the processing circuit 140 may control the actuators 114-119 to move the optical component module 60 during automatic alignment.

Figure 2:
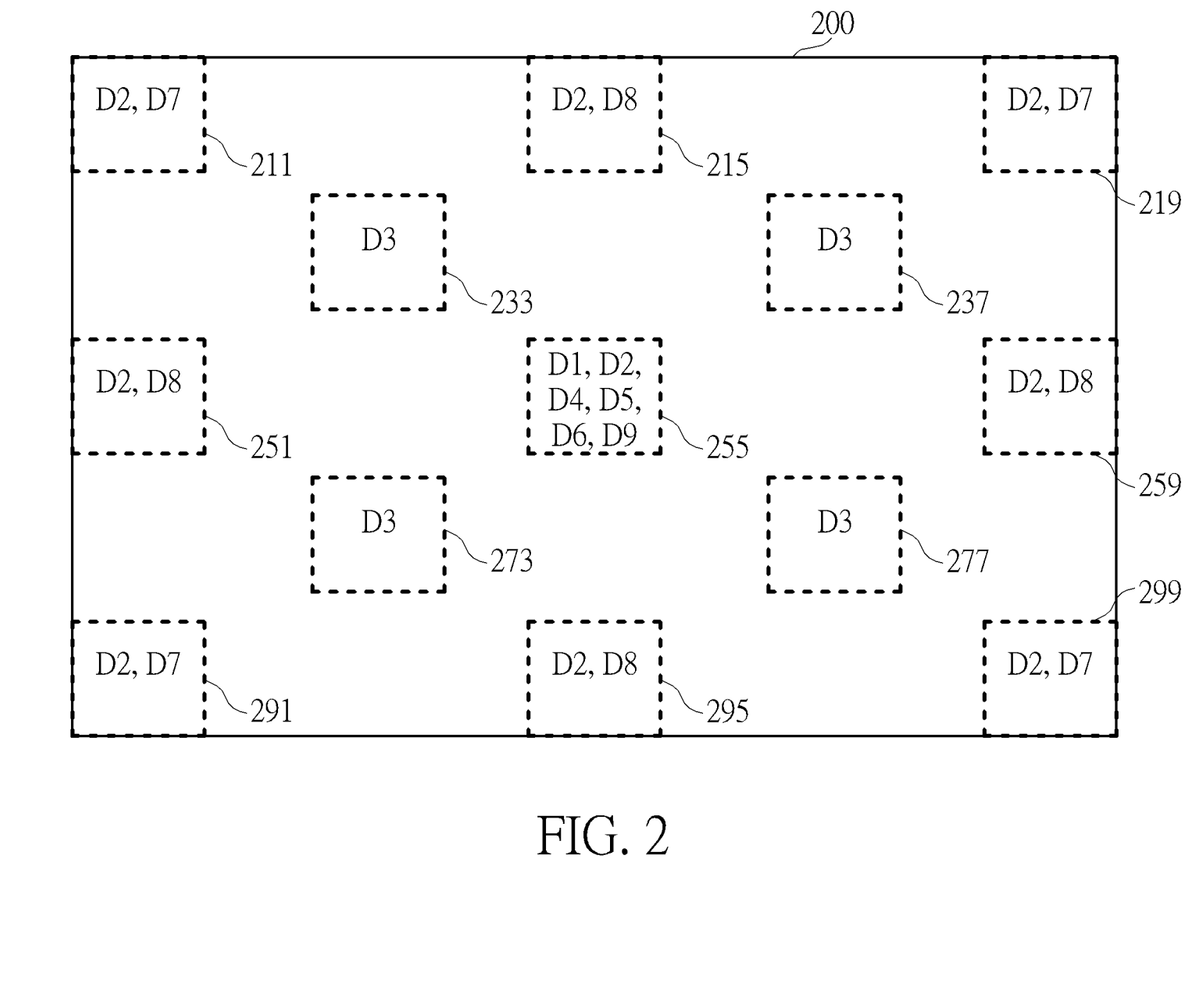
FIG. 2 illustrates some detection regions and associated detections according to an embodiment of the present invention.

FIG. 2 illustrates some detection regions 211, 215, 219, 233, 237, 251, 255, 259, 273, 277, 291, 295, and 299 according to an embodiment of the present invention, where the whole area 200 may correspond to the projection area of each of the first and the second sub-paths (e.g. the image area projected on the screen 10 by the light source module, and the image area projected toward the direction of the second cameras 122 by the light source module). For better comprehension, some associated detections D1, D2, D3, D4, D5, D6, D7, D8, and D9 are labeled at these regions to indicate the regions suitable for one or more of these detections, respectively. According to this embodiment, the detections D1-D9 may be listed as follows:
(D1). sharpness;
(D2). brightness;
(D3). contrast;
(D4). location of central image content;
(D5). shape of central image content;
(D6). size of central image content;
(D7). location(s) of corner(s);
(D8). distortion of side(s)/boundary; and
(D9). angle of central image contents;

where the central image content in the detections D4-D6 may represent a predetermined image content at the center of the whole area, and the central image contents in the detection D9 may represent some predetermined image contents around the center of the whole area. Based on some predetermined criteria for the detections D1-D9, The processing circuit 140 may determine whether the optical output module passes the detections D1-D9 in one or more alignment operations according to the associated detection results, respectively.

For example, in a situation where N=13, the second cameras 122 may be positioned at the associated regions (such as that corresponding to the detection regions 211, 215, 219, 233, 237, 251, 255, 259, 273, 277, 291, 295, and 299), respectively. For another example, in a situation where N=3, the second cameras 122_1, 122_2, and 122_3 may be positioned at one corner region (such as that corresponding to one of the detection regions 211, 219, 291, and 299), the center region (such as that corresponding to the detection region 255), and another corner region (such as that corresponding to another of the detection regions 211, 219, 291, and 299), respectively.

Figure 3:
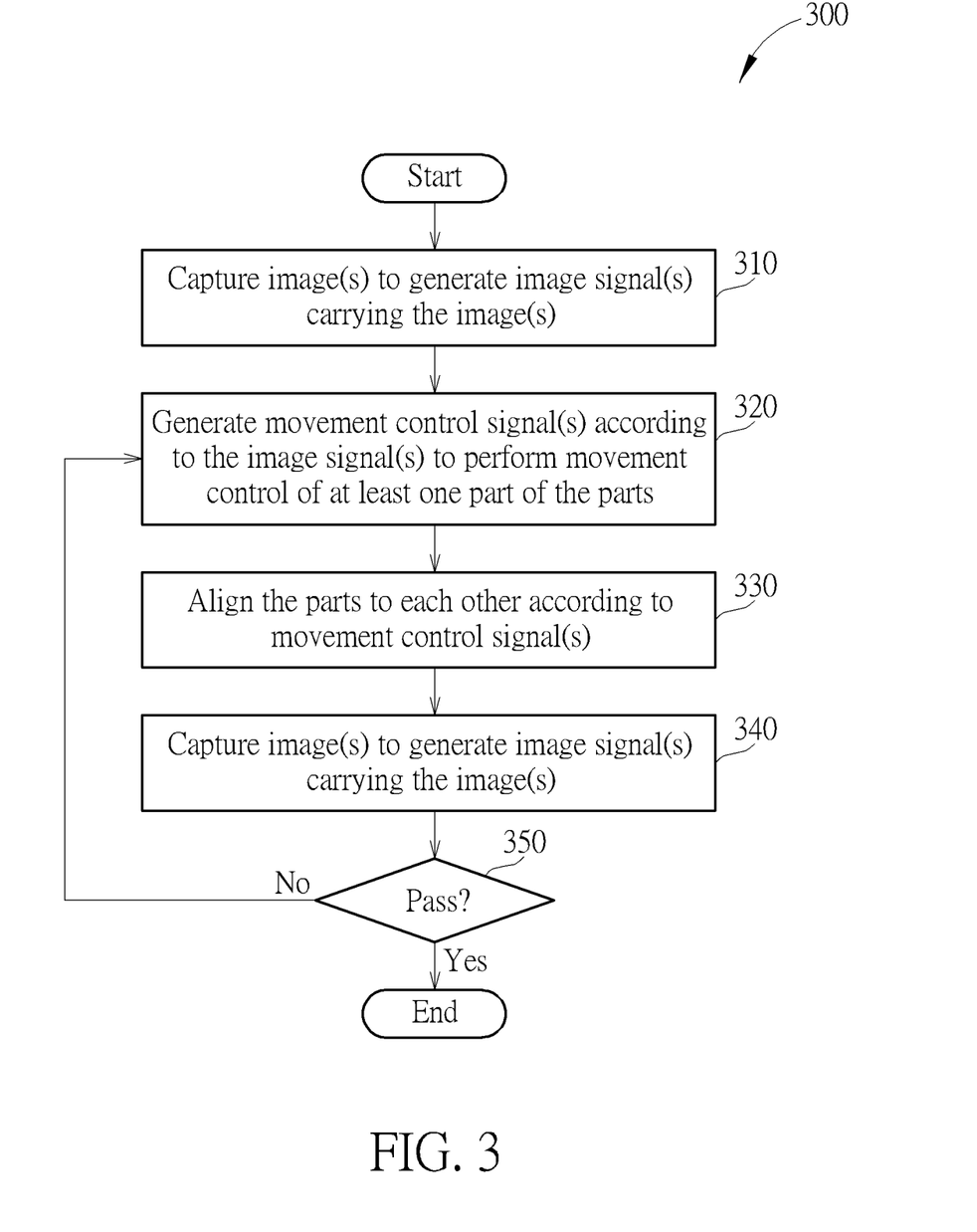
FIG. 3 is a flowchart of a method for performing automatic alignment according to an embodiment of the present invention.

FIG. 3 is a flowchart of a method 300 for performing automatic alignment according to an embodiment of the present invention, where the method 300 can be taken as an example of the method mentioned above. For example, the working flow shown in FIG. 3 may be performed in one of multiple alignment operations, such as a coarse alignment operation or a fine alignment operation.

In Step 310, at least one portion (e.g. a portion or all) of the cameras 121 and 122 may capture image (s) to generate image signal (s) carrying the image(s), such as the first image signal carrying the first image and/or the second image signals carrying the second images.

In Step 320, the processing circuit 140 may generate movement control signal (s) according to the image signal (s) to perform movement control of the aforementioned at least one part of the parts (e.g. the specific module such as the optical component module 60).

In Step 330, the alignment tool 110 may align the parts to each other according to movement control signal(s).

In Step 340, the aforementioned at least one portion (e.g. a portion or all) of the cameras 121 and 122 may capture image(s) to generate image signal(s) carrying the image(s), such as the first image signal carrying the first image and/or the second image signals carrying the second images.

In Step 350, the processing circuit 140 may determine whether the optical output module passes all of the detection(s) of this alignment operation (e.g. one or more predetermined detections such as that selected from the detections D1-D9) according to the associated detection result(s). When the optical output module passes all of the detection(s) of this alignment operation, the working flow shown in FIG. 3 come to the end; otherwise, Step 320 is entered.

Some implementation details of the method 300 have been described in the above embodiments. For brevity, the associated implementation details of the method 300 are not repeated in detail here.

According to some embodiments, the operations of two of the steps shown in FIG. 3 may be performed at the same time. According to some embodiments, one or more steps may be altered or added.

Figure 4:
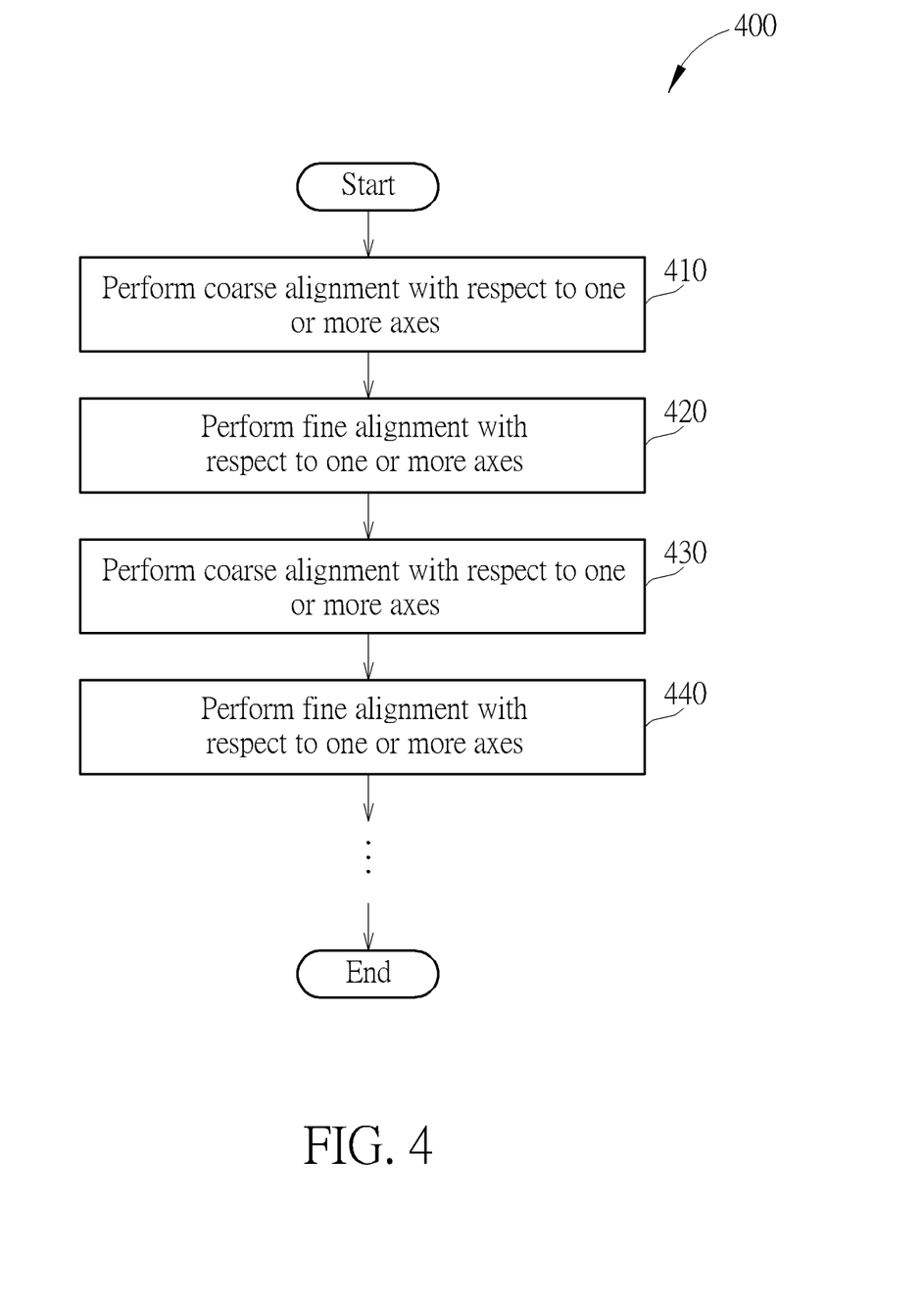
FIG. 4 illustrates a working flow related to the method shown in FIG. 3 according to an embodiment of the present invention.

FIG. 4 illustrates a working flow 400 related to the method 300 shown in FIG. 3 according to an embodiment of the present invention. The automatic alignment apparatus may perform coarse alignment with respect to one or more axes (in Step 410), fine alignment with respect to one or more axes (in Step 420), coarse alignment with respect to one or more axes (in Step 430), fine alignment with respect to one or more axes (in Step 440), and so on. For example, in each alignment operation within the coarse alignment operations of Steps 410, 430, etc. and the fine alignment operations of Steps 420, 440, etc., the automatic alignment apparatus may perform the operations of the method 300 under control of the processing circuit 140. According to this embodiment, the processing circuit 140 may change at least one portion of the plurality of movement control signals according to the first image signal to perform movement control of the aforementioned at least one part of the parts (e.g. the specific module such as the optical component module 60) during any of the coarse alignment operations of Steps 410, 430, etc., and may change at least one portion of the plurality of movement control signals according to the second image signals to perform movement control of the aforementioned at least one part of the parts (e.g. the specific module such as the optical component module 60) during any of the fine alignment operations of Steps 420, 440, etc. Under control of the processing circuit 140, the alignment tool 110 may perform the coarse alignment operations and the fine alignment operations on the parts according to the plurality of movement control signals. For example, when needed, the automatic alignment apparatus may output notification information to indicate that the automatic alignment is completed.

According to this embodiment, the phases for assembly of the optical output module may further comprise an initial phase and an adhering phase. Before being held by the alignment tool 110, the radiation source module 50 and the optical component module 60 are separated from each other. For example, during assembling the optical output module, the user of the automatic alignment apparatus (e.g. an operator) may simply put the parts of the optical output module on the holders 111 and 112 respectively in the initial phase, and then the automatic alignment apparatus may automatically align the parts to each other in the alignment phase. After the automatic alignment is completed in the alignment phase, the adhering phase may be entered. In the adhering phase, the automatic alignment apparatus allows the radiation source module 50 and the optical component module 60 to adhere to each other through at least one adherence material such as ultraviolet (UV) curable adhesive, where the adherence material may be applied to the parts manually or automatically. For example, the user (e.g. the operator) may apply the UV curable adhesive to the parts and cure it with UV light, so the parts are fixed. As a result, the assembly of the optical output module may be completed with ease. After assembly of the optical output module is completed, the optical output module may be removed from the alignment tool 110. For another example, the automatic alignment apparatus may automatically perform the operations of applying the UV curable adhesive to the parts and curing it with UV light. In some embodiments, the automatic alignment apparatus may automatically put the parts on the holders 111 and 112 in the initial phase, and/or may automatically remove the optical output module from the alignment tool 110. In some embodiments, the UV curable adhesive may be replaced by one of other types of adherence materials.

According to some embodiments, the processing circuit 140 may perform at least one first detection operation (e.g. one or more of the detections D1-D9) on the first image carried by the first image signal to generate at least one first detection result during each of the coarse alignment operations. Based on at least one first criterion (e.g. criteria for the at least one or more of the detections D1-D9), the processing circuit 140 may determine whether the coarse alignment operation is completed according to the first detection result(s). With regard to changing at least one portion of the plurality of movement control signals according to the first image signal, during the coarse alignment operation, the processing circuit 140 may refer to the at least one first detection result to selectively adjust the plurality of movement control signals. In addition, the processing circuit 140 may perform second detection operations (e.g. at least one portion of the detections D1-D9) on the second images carried by the second image signals to generate second detection results, respectively, during each of the fine alignment operations. Based on at least one second criterion (e.g. criteria for the at least one portion of the detections D1-D9), the processing circuit 140 may determine whether the fine alignment operation is completed according to the second detection results. With regard to changing at least one portion of the plurality of movement control signals according to the second image signals, during the fine alignment operation, the processing circuit 140 may refer to the second detection results to selectively adjust the plurality of movement control signals. In some embodiments, when performing the first detection operation(s), the processing circuit 140 may detect one or a combination of sharpness and contrast of the first image contents indicated by the first image. In addition, when performing the second detection operations(s), the processing circuit 140 may detect one or a combination of sharpness and contrast of the second image contents indicated by the second images, respectively.

According to some embodiments, the screen 10 may be replaced by a planar object (e.g. the wall, the white board, etc.). According to some embodiments, the camera count N of the second cameras 122 may vary. For example, N=2, and the second cameras 122_1 and 122_2 may be positioned at one corner region (such as that corresponding to one of the detection regions 211, 219, 291, and 299) and the center region (such as that corresponding to the detection region 255), respectively. For other examples, N may be any of other values, as long as implementation of the present invention will not be hindered. According to some embodiments, the specific module and the other module may represent the radiation source module 50 and the optical component module 60, respectively, and the holder 112 may be kept static so the optical component module 60 does not move, and the processing circuit 140 may control the actuators 114-119 to move the radiation source module 50 during automatic alignment.

According to some embodiments, the first camera 121 may be tilted with a tilt angle, and the processing circuit 140 may apply a tile calibration to correct the tilt effect caused by this tilt angle. According to some embodiments, the reflection ratio of the beam splitter 130 may be less than the transmission ratio of the beam splitter 130, and the first sub-path and the second sub-path may be exchanged, which means the screen 10 is moved to the side where the second cameras 122 was originally located (e.g. around the top of FIG. 1) and the second cameras 122 is moved to the side where the screen 10 was originally located (e.g. around the left of FIG. 1. In addition, the beam splitter 130 may be arranged to split the optical path into the first sub-path (e.g. an upward sub-path starting from the beam splitter 130 in this example) allowing the first image contents being projected on the screen 10 by the optical output module and the second sub-path (e.g. a leftward sub-path starting from the beam splitter 130 in this example) allowing the second image contents being projected toward a direction different from that of the screen 10 by the optical output module. Additionally, the first camera 121 may be positioned beside the holder 112 with a tile angle to capture the first image contents on the screen 10, and the processing circuit 140 may apply a tile calibration to correct the tilt effect caused by this tilt effect. According to some embodiments, a difference between the reflection ratio and the transmission ratio of the beam splitter 130 may be sufficient to make the optical power on the second sub-path be much lower than that of the first sub-path, so the attenuator (ATN) in each of the second cameras 122 may be removed without degrading the image quality of the second cameras 122.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An automatic alignment apparatus applicable to assembly of an optical output module, the automatic alignment apparatus comprising:
    an alignment tool, arranged to hold different parts of the optical output module, wherein the parts comprise a radiation source module and an optical component module;
    a beam splitter, positioned on an optical path that starts from the radiation source module, arranged to split the optical path into a first sub-path allowing first image contents being projected on a screen by the optical output module and a second sub-path allowing second image contents being projected toward a direction different from that of the screen by the optical output module;
    a first camera, arranged to capture at least one first image to generate a first image signal carrying the first image, wherein the first image corresponds to the first image contents projected on the screen by the optical output module;
    a plurality of second cameras, arranged to capture a plurality of second images to generate second image signals carrying the second images, respectively, wherein the second images correspond to the second image contents projected by the optical output module, respectively; and
    a processing circuit, arranged to generate at least one movement control signal according to at least one image signal within the first and the second image signals to perform movement control of at least one part of the parts;
    wherein the alignment tool is further arranged to automatically align the parts to each other according to the at least one movement control signal.

2. The automatic alignment apparatus of claim 1, wherein the at least one movement control signal comprises a plurality of movement control signals; and the alignment tool comprises:
    a plurality of holders, arranged to respectively hold the radiation source module and the optical component module; and
    a plurality of actuators, arranged to receive the plurality of movement control signals, and control movement of a specific module within the radiation source module and the optical component module with respect to another module within the radiation source module and the optical component module according to the plurality of movement control signals.

3. The automatic alignment apparatus of claim 2, wherein the plurality of holders holds the radiation source module and the optical component module during multiple phases for assembly of the optical output module; and the plurality of actuators controls the movement of the specific module with respect to the other module according to the plurality of movement control signals in an alignment phase, wherein the phases for assembly of the optical output module comprises the alignment phase.

4. The automatic alignment apparatus of claim 2, wherein the plurality of actuators comprises:
    at least one first actuator, arranged to shift the specific module according to at least one first movement control signal within the plurality of movement control signals; and
    at least one second actuator, arranged to rotate the specific module according to at least one second movement control signal within the plurality of movement control signals.

5. The automatic alignment apparatus of claim 1, wherein the alignment tool respectively holds the radiation source module and the optical component module during multiple phases for assembly of the optical output module; and the phases for assembly of the optical output module comprises an adhering phase, in which the automatic alignment apparatus allows the radiation source module and the optical component module to adhere to each other through at least one adherence material.

6. The automatic alignment apparatus of claim 1, wherein the second image contents are local image contents with respect to the first image contents.

7. The automatic alignment apparatus of claim 1, wherein a reflection ratio of the beam splitter is not equivalent to a transmission ratio of the beam splitter; and optical power on the first sub-path is higher than that on the second sub-path.

8. The automatic alignment apparatus of claim 1, wherein the at least one movement control signal comprises a plurality of movement control signals; the processing circuit changes at least one portion of the plurality of movement control signals according to the first image signal to perform movement control of the at least one part of the parts during at least one coarse alignment operation, and changes at least one portion of the plurality of movement control signals according to the second image signals to perform movement control of the at least one part of the parts during at least one fine alignment operation; and the alignment tool is arranged to perform the at least one coarse alignment operation and the at least one fine alignment operation on the parts.

9. The automatic alignment apparatus of claim 1, wherein the radiation source module and the optical component module are separated from each other before being held by the alignment tool.

10. The automatic alignment apparatus of claim 1, wherein after assembly of the optical output module is completed, the optical output module is removed from the alignment tool.

11. A method for performing automatic alignment, the method being applicable to assembly of an optical output module, the method comprising:
    holding different parts of the optical output module, wherein the parts comprise a radiation source module and an optical component module;
    utilizing a beam splitter, positioned on an optical path that starts from the radiation source module, to split the optical path into a first sub-path allowing first image contents being projected on a screen by the optical output module and a second sub-path allowing second image contents being projected toward a direction different from that of the screen by the optical output module;

capturing at least one first image to generate a first image signal carrying the first image, wherein the first image corresponds to the first image contents projected on the screen by the optical output module;

capturing a plurality of second images to generate second image signals carrying the second images, respectively, wherein the second images correspond to the second image contents projected by the optical output module, respectively;

generating at least one movement control signal according to at least one image signal within the first and the second image signals to perform movement control of at least one part of the parts; and automatically aligning the parts to each other according to the at least one movement control signal.

12. The method of claim 11, wherein the at least one movement control signal comprises a plurality of movement control signals; and holding the parts comprises:

utilizing a plurality of holders of an alignment tool to respectively hold the radiation source module and the optical component module;

wherein automatically aligning the parts to each other comprises:

utilizing a plurality of actuators of the alignment tool to receive the plurality of movement control signals, and control movement of a specific module within the radiation source module and the optical component module with respect to another module within the radiation source module and the optical component module according to the plurality of movement control signals.

13. The method of claim 12, wherein the plurality of holders holds the radiation source module and the optical component module during multiple phases for assembly of the optical output module; and the plurality of actuators controls the movement of the specific module with respect to the other module according to the plurality of movement control signals in an alignment phase, wherein the phases for assembly of the optical output module comprises the alignment phase.

14. The method of claim 12, wherein utilizing the plurality of actuators comprises:

utilizing at least one first actuator of the plurality of actuators to shift the specific module according to at least one first movement control signal within the plurality of movement control signals; and utilizing at least one second actuator of the plurality of actuators to rotate the specific module according to at least one second movement control signal within the plurality of movement control signals.

15. The method of claim 11, wherein holding the parts comprises:

respectively holding the radiation source module and the optical component module during multiple phases for assembly of the optical output module;

wherein the phases for assembly of the optical output module comprises an adhering phase, in which the radiation source module and the optical component module are allowed to adhere to each other through at least one adherence material.

16. The method of claim 11, wherein the second image contents are local image contents with respect to the first image contents.

17. The method of claim 11, wherein a reflection ratio of the beam splitter is not equivalent to a transmission ratio of the beam splitter; and optical power on the first sub-path is higher than that on the second sub-path.

18. The method of claim 11, wherein the at least one movement control signal comprises a plurality of movement control signals; and generating the at least one movement control signal comprises:

changing at least one portion of the plurality of movement control signals according to the first image signal to perform movement control of the at least one part of the parts during at least one coarse alignment operation; and changing at least one portion of the plurality of movement control signals according to the second image signals to perform movement control of the at least one part of the parts during at least one fine alignment operation;

wherein automatically aligning the parts comprises:

performing the at least one coarse alignment operation and the at least one fine alignment operation on the parts.

19. The method of claim 18, further comprising:

performing at least one first detection operation on the first image carried by the first image signal to generate at least one first detection result during the at least one coarse alignment operation;

based on at least one first criterion, determining whether the at least one coarse alignment operation is completed according to the at least one first detection result;

performing second detection operations on the second images carried by the second image signals to generate second detection results, respectively, during the at least one fine alignment operation; and based on at least one second criterion, determining whether the at least one fine alignment operation is completed according to the second detection results;

wherein:

changing at least one portion of the plurality of movement control signals according to the first image signal comprises:

during the at least one coarse alignment operation, referring to the at least one first detection result to selectively adjust the plurality of movement control signals; and changing at least one portion of the plurality of movement control signals according to the second image signals comprises:

during the at least one fine alignment operation, referring to the second detection results to selectively adjust the plurality of movement control signals.

20. The method of claim 19, wherein performing the at least one first detection operation comprises:

detecting one or a combination of sharpness and contrast of the first image contents indicated by the first image;

wherein performing the second detection operations comprises:

detecting one or a combination of sharpness and contrast of the second image contents indicated by the second images, respectively.

* * * * *